United States Patent [19]

Tanabe

[11] 4,131,139
[45] Dec. 26, 1978

[54] GAS FILLING METHOD FOR GAS SPRING

[75] Inventor: Hisao Tanabe, Yokohama, Japan

[73] Assignee: Tokico Ltd., Kawasaki, Japan

[21] Appl. No.: 746,639

[22] Filed: Dec. 1, 1976

[30] Foreign Application Priority Data

Dec. 10, 1975 [JP] Japan .............................. 50/147604

[51] Int. Cl.² .............................................. B65B 3/04
[52] U.S. Cl. ........................................ 141/4; 141/98;
188/269; 188/317
[58] Field of Search ........................... 141/1, 98, 4-8,
141/197; 267/64 R; 188/322, 352, 314, 269

[56] References Cited

U.S. PATENT DOCUMENTS 3,313,536  4/1967  Dutton et al. ................... 267/64 R
4,030,716  6/1977  Freitag ............................ 267/64 R Primary Examiner—Houston S. Bell
Attorney, Agent, or Firm—Wenderoth, Lind & Ponack

[57] ABSTRACT

A method for filling gas into a cylinder having a rod slidably extending from one end thereof. The method involves the steps of forming a reduced diameter portion in the rod at a position adjacent to the inner end thereof, locating the rod at the position of maximum extension so as to form a gas filling passage between the reduced diameter portion and an annular seal ring, filling a high pressure gas into the cylinder, moving the rod inwardly to close the gas filling passage, and deforming a portion of the cylinder to form a stop restricting the outward movement of the rod.

3 Claims, 4 Drawing Figures

GAS FILLING METHOD FOR GAS SPRING

This invention relates to a method for filling gas into a cylindrical container such as an oleo-pneumatic shock absorber or a gas spring containing high pressure gas therein and having a rod movably projecting from one end of the container, and to the container containing high pressure gas therein.

One of prior art methods for filling high pressure gas into a cylindrical container of the aforesaid type consists of forming a reduced diameter portion in the rod projecting outwardly from the container at a position remote from a piston slidably disposed in the container and connected to the rod, forming a passage between the reduced diameter portion and a seal sealing the rod by retracting the rod into the container by an amount exceeding the normal retracted position, filling gas into the container through the passage, and thereafter closing the passage by moving the rod outwardly by the said amount. Another prior art method comprises forming a small hole in the bottom portion of the container, filling high pressure gas into the container through the hole, and closing the hole by utilizing a plug or welding.

In the former method, since the rod is moved into the container by an additional amount exceeding the amount for reaching the normal retracted position for filling gas into the container, it is required to supply gas under a pressure higher than the normal maximum pressure in the container so as to supply sufficient gas to fill the volume of the cylinder occupied by the additional length of the piston rod. Thus this method is expensive and dangerous.

An object of the present invention is to overcome the aforementioned shortcomings in the prior art methods by forming a reduced diameter portion in the rod at a position adjacent to the inner end thereof, moving the rod out of the cylinder to a position beyond the normal maximum extended position by a predetermined amount so as to form a passage communicating the interior of the cylinder with the outside thereof through the passage, filling high pressure gas into the cylinder through the passage, thereafter, moving the rod into the cylinder so as to close the passage, and deforming the cylinder wall to close the passage permanently.

An embodiment of the present invention will be explained in detail in conjunction with the accompanying drawings, in which.

Figure 1:
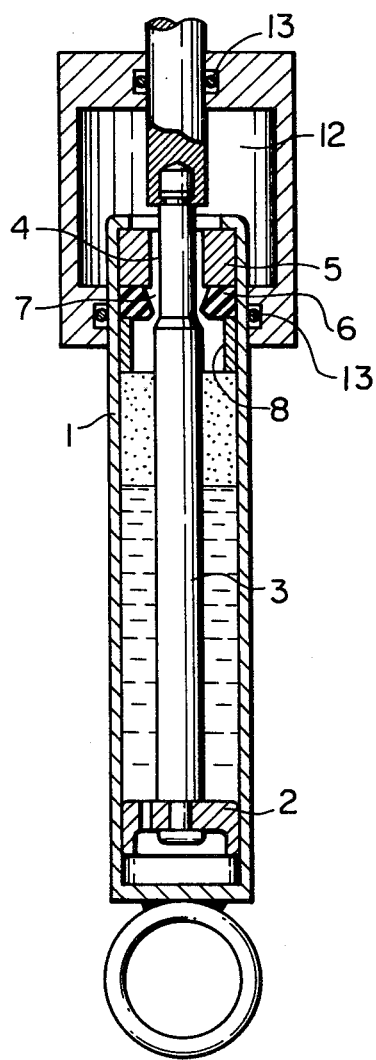
FIG. 1 is a cross-sectional view of a prior art gas spring.

In one prior art gas spring shown in FIG. 1, a reduced diameter portion 4 is formed in the upper end of a rod 3, and a piston 2 slidably disposed in a cylinder 1 is attached to the lower end of the rod 3. The rod 2 projects outwardly of the cylinder 1 through the upper open end thereof and through a seal ring 6 and a rod guide 5 which are retained in the upper end of the cylinder 1. When the piston 1 is moved to its maximum retracted position shown in the drawing, a passage 7 is formed between the reduced diameter portion 4 and the seal ring 6 and the rod guide 5. By enclosing the upper end portion of the cylinder 1 with a suitable high pressure chamber 12, high pressure gas can be filled into the cylinder 1 through the passage 7. Thereafter, the rod 3 is moved outwardly by an amount sufficient to close the passage 7 with the seal ring 6 contacting the large diameter portion of the rod 3, and which position defines the normal maximum retracted position. A suitable device (not shown) is attached to the projecting portion of the rod 3 for preventing retracting movement of the rod 3 past the normal retracted position.

Figure 2:
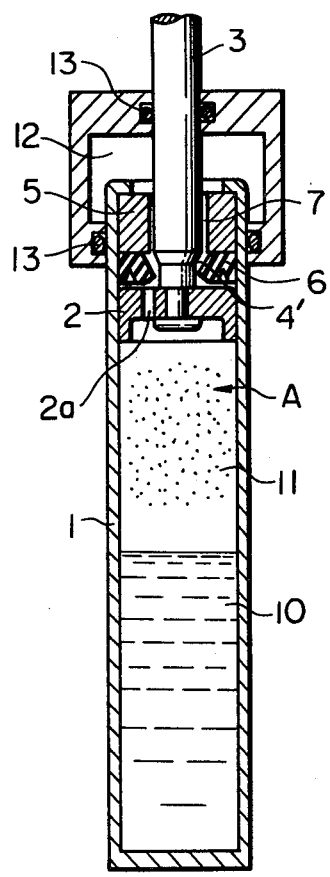
FIG. 2 is a cross-sectional view of a gas spring according to the present invention and showing the parts in position for carrying out the gas filling operation.
Figure 3:
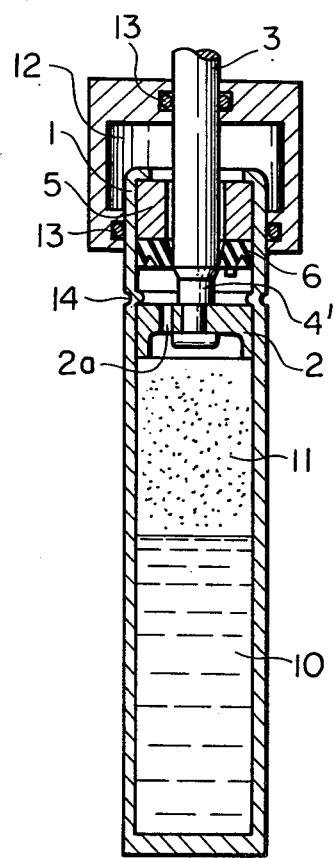
FIG. 3 is a view similar to FIG. 2 but showing a condition wherein the rod is moved into the cylinder closing gas filling passage.
Figure 4:
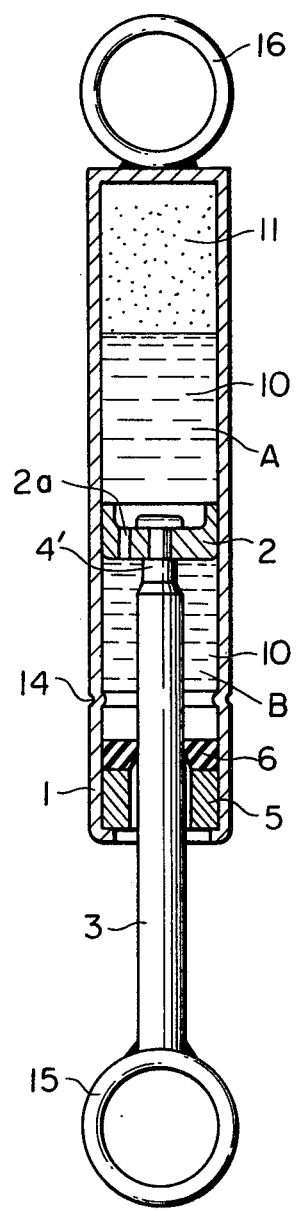
FIG. 4 is a cross-sectional view of the gas spring of FIGS. 2 and 3 during usage.

The gas spring shown in FIGS. 2 to 4 according to the present invention has a construction similar to FIG. 1 and corresponding parts are denoted by the same reference numerals.

In FIGS. 2 to 4, a piston 2 partitions the interior of the cylinder 1 into chambers A and B as shown clearly in FIG. 4. A reduced diameter portion 4' is formed in a rod 3 at a position adjacent to the piston 2 as shown in FIG. 2, which cooperates with a seal ring 6 and a rod guide 5 to form a gas filling passage 7 therebetween. A predetermined amount of oil 10 and a high pressure gas 11 are filled into the cylinder 1. FIG. 2 shows the parts in position for carrying out the gas filling operation wherein the upper end portion (or the whole body of) the cylinder 1 is enclosed in a high pressure gas chamber 12 and the gas is filled into the cylinder 1 through the passage 7. When the pressure of the gas 11 reaches a predetermined value the rod 3 is moved inward as shown in FIG. 3 so as to close the passage 7 by the large diameter portion of the rod 3 engaging with the seal ring 6. A suitable portion of the cylinder 1 is deformed to form an inwardly extending projection 14 on the inner wall of the cylinder 1 which acts as a stop for restricting the outward movement of the piston 2 to prevent gas leakage. Thereafter the cylinder 1 is removed from the high pressure chamber 12. A plurality of radial projections spaced angularly around the cylinder 1 can be provided to constitute the stop.

FIG. 4 shows the use of the gas spring, in which the gas spring is positioned upside down and fittings 15 and 16 are secured to the opposite ends thereof. The piston 2 divides the interior of the cylinder 1 into chambers A and B, and a passage 2a formed in the piston produces a hydraulic damping force when the piston 2 moves in the cylinder 1. Suitable valve mechanism may be provided in the piston 2 (not shown).

As heretofore described, the gas filling method according to the present invention comprises the steps of filling a high pressure gas into a cylindrical container with a rod projecting outwardly by an amount exceeding the normal maximum extended position, deforming the cylinder to form a projection on the inner peripheral surface of the cylinder which acts as a stop defining the maximum projecting position of the rod thus preventing gas leakage through the gas filling passage, whereby the pressure of the gas filled into the cylinder can be reduced relative to the prior art methods, and the direct engagement of the piston with the seal ring can be prevented even when the rod projects outwardly of the cylinder to the maximum extent and, further, leakage of the gas or the oil can be prevented, and it is possible to omit an additional stop member on the rod. The gas filling operation can be effected with increased safety since the pressure of the gas being filled into the cylinder is lower than the normal maximum pressure. Further, in the prior art method the rod is pressed inwardly during the operation of filling the gas while in the present invention the rod is urged outwardly by the pressure of the gas filled into the cylinder. Thus, it is possible in the present method to omit a rod retaining device which is required in the prior art method.

Therefore, it is possible to fill a high pressure gas into a cylindrical container, according to the present invention, very simply, safely, reliably and economically.

What is claimed is:

1. A method for filling gas into a container having a piston therein and a piston rod on said piston extending out of one end of said container and an annular seal at said one end of said container through which said rod extends in sealing relationship, said method comprising the steps of forming a reduced diameter portion in said rod at a position adjacent to said piston and having a radial depth greater than that for accomodating said annular seal therein without deformation of said seal, moving the rod out of said one end of the container to the maximum extended position in which said reduced diameter portion is within said annular seal and said annular seal terminates short of the bottom of said reduced diameter portion for leaving a gas filling passage between the reduced diameter portion and said annular seal, said passage communicating the inside and outside of the container, filling a high pressure gas into the container through said passage while said annular seal remains undeformed, thereafter moving the rod inwardly for bringing the unreduced diameter portion of the rod into sealing engagement with said annular seal to close said passage, and deforming a portion of the container positioned at a point along said container spaced from said one end to form a stop restricting the outward movement of the piston, thereby preventing the rod from moving to the maximum extended position wherein the seal ring and the reduced diameter portion of the rod have said gas filling passage therebetween.

2. A method for filling gas into a container as claimed in claim 1 in which the step of deforming the container comprises forming a plurality of angularly spaced inwardly extending radial projections in the inner wall of the container.

3. A gas spring comprising a cylinder having a piston slidable therein, a rod secured to the piston and extending out of one end of the cylinder to a maximum extended position and with said piston adjacent said one end of said cylinder prior to filling the spring with gas, an annular seal in said one end of said cylinder in sealing engagement with said rod, said rod having a reduced diameter portion at a position adjacent the piston and having a radial depth greater than that for accomodating said annular seal without deformation of said seal for forming a gas filling passage between said reduced diameter portion and said annular seal in an underformed condition when the rod is positioned at the maximum extended position, and after filling high pressure gas into the gas spring thereby moving the rod and the piston into the cylinder, a stop means provided on said cylinder extending radially inwardly from said cylinder at a position spaced along said cylinder from said one end thereof between the piston and said one end of said cylinder for preventing the rod from moving to said maximum extended position during normal movements of said rod and piston in said gas spring.

* * * * *